July 3, 1934.  O. U. ZERK  1,965,022
LUBRICATING APPARATUS
Filed May 19, 1930  7 Sheets-Sheet 1

Inventor
Oscar U. Zerk
By Williams Bradbury
McCaleb & Hirsch Attys.

July 3, 1934.  O. U. ZERK  1,965,022
LUBRICATING APPARATUS
Filed May 19, 1930  7 Sheets-Sheet 2

July 3, 1934.  O. U. ZERK  1,965,022
LUBRICATING APPARATUS
Filed May 19, 1930  7 Sheets-Sheet 6

Inventor
Oscar U. Zerk
By Williams Bradbury
McCaleb & Hinkle
Attys.

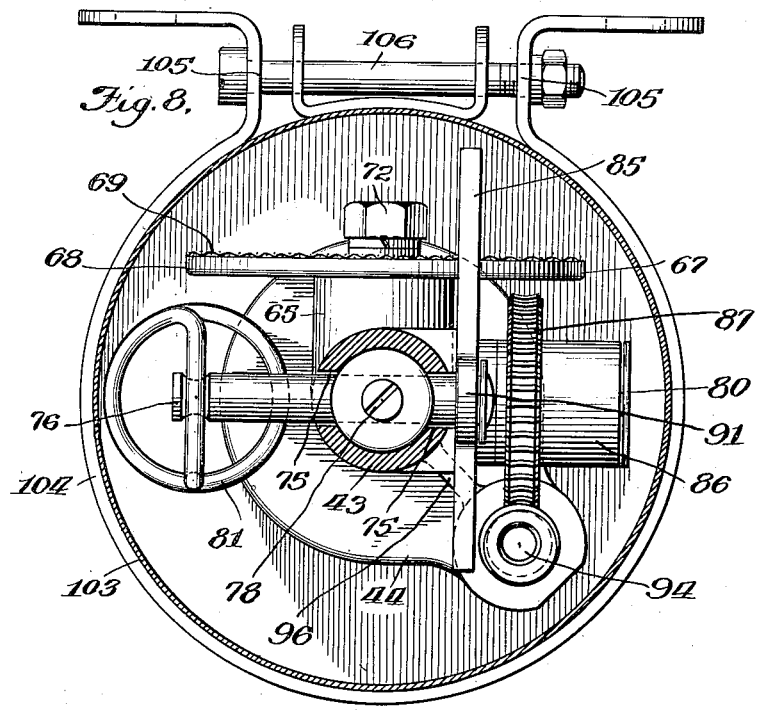
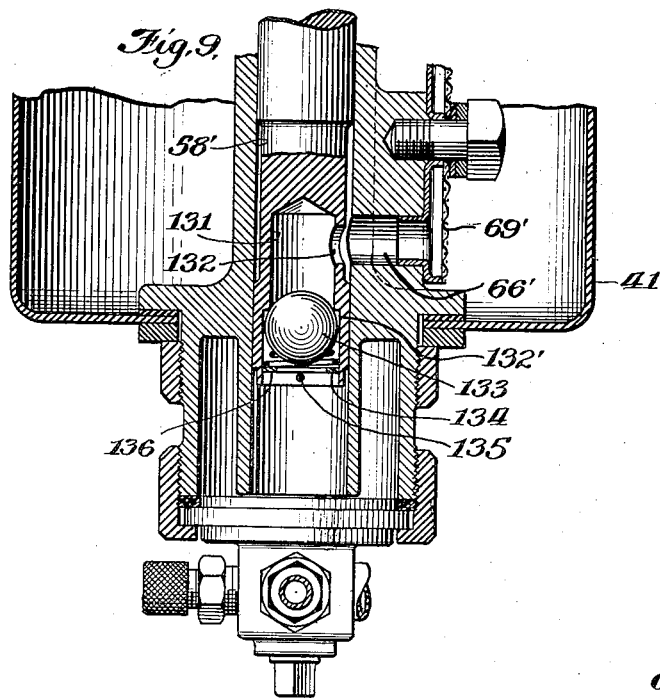

UNITED STATES PATENT OFFICE 1,965,022

LUBRICATING APPARATUS

Oscar U. Zerk, Chicago, Ill., assignor to Alemite Corporation, Chicago, Ill., a corporation of Delaware Application May 19, 1930, Serial No. 453,489

4 Claims. (Cl. 184—27)

My invention relates to lubricating apparatus and particularly to lubricating apparatus for motor vehicles in which the bearings of the vehicle chassis are lubricated from a centralized source.

An object of the invention is to provide a new and improved lubricating apparatus.

A further object is to provide a lubricating apparatus for a motor vehicle which may be readily attached to the driving mechanism of the vehicle.

A further object is to provide a lubricating apparatus for a motor vehicle which may be readily installed in connection with the actuating mechanism for the speedometer.

A further object is to provide a lubricant container in which the lubricant distributing means is mounted on a rugged base permitting the remainder of the container to be made of light materials.

A further object is to provide a simple and effective actuating means for the lubricant pump in which back lash of the gearing is eliminated.

Other objects and advantages will appear as the description proceeds.

Referring to the drawing:

Figure 8 is a section through the container taken on line 8—8 of Figure 3; and

Figure 9 is a fragmentary section showing a modified form of distributing pump in the container.

Figure 1:
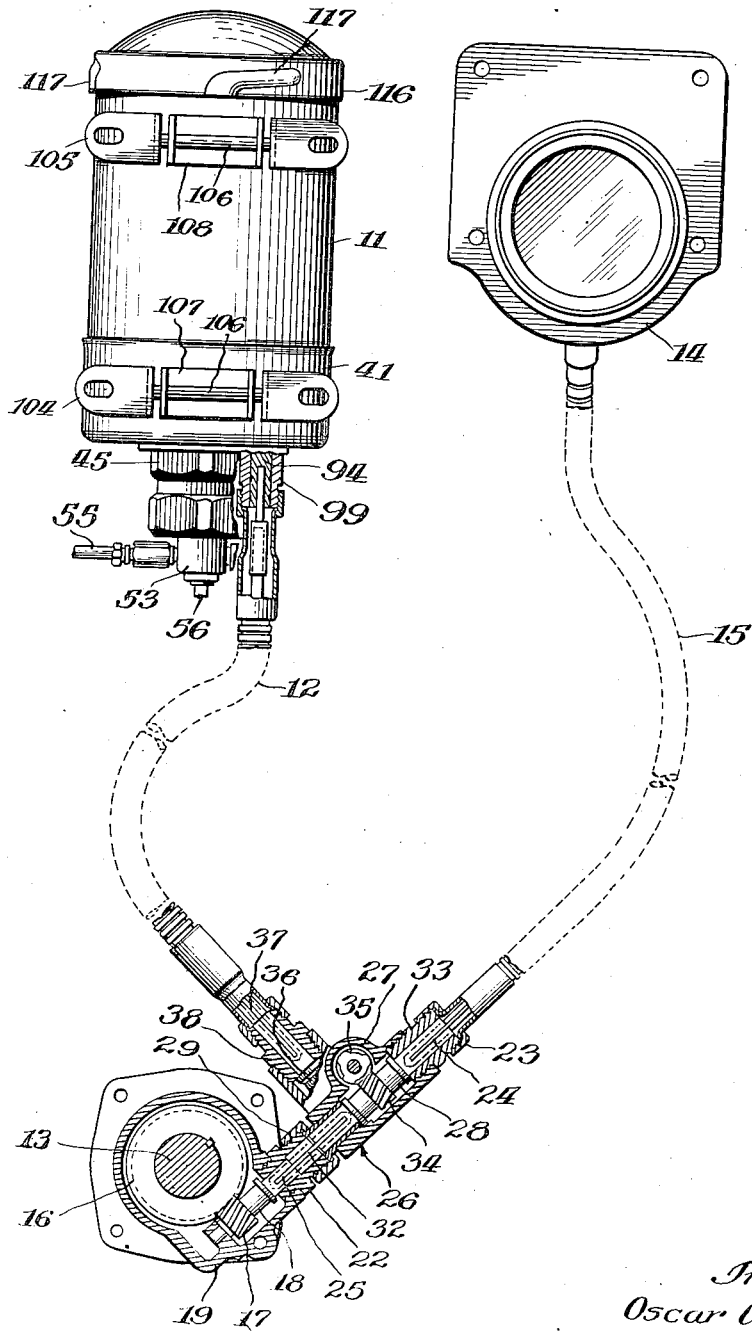
Figure 1 is a side elevation partly in section of the apparatus embodying my invention.
Figure 2:
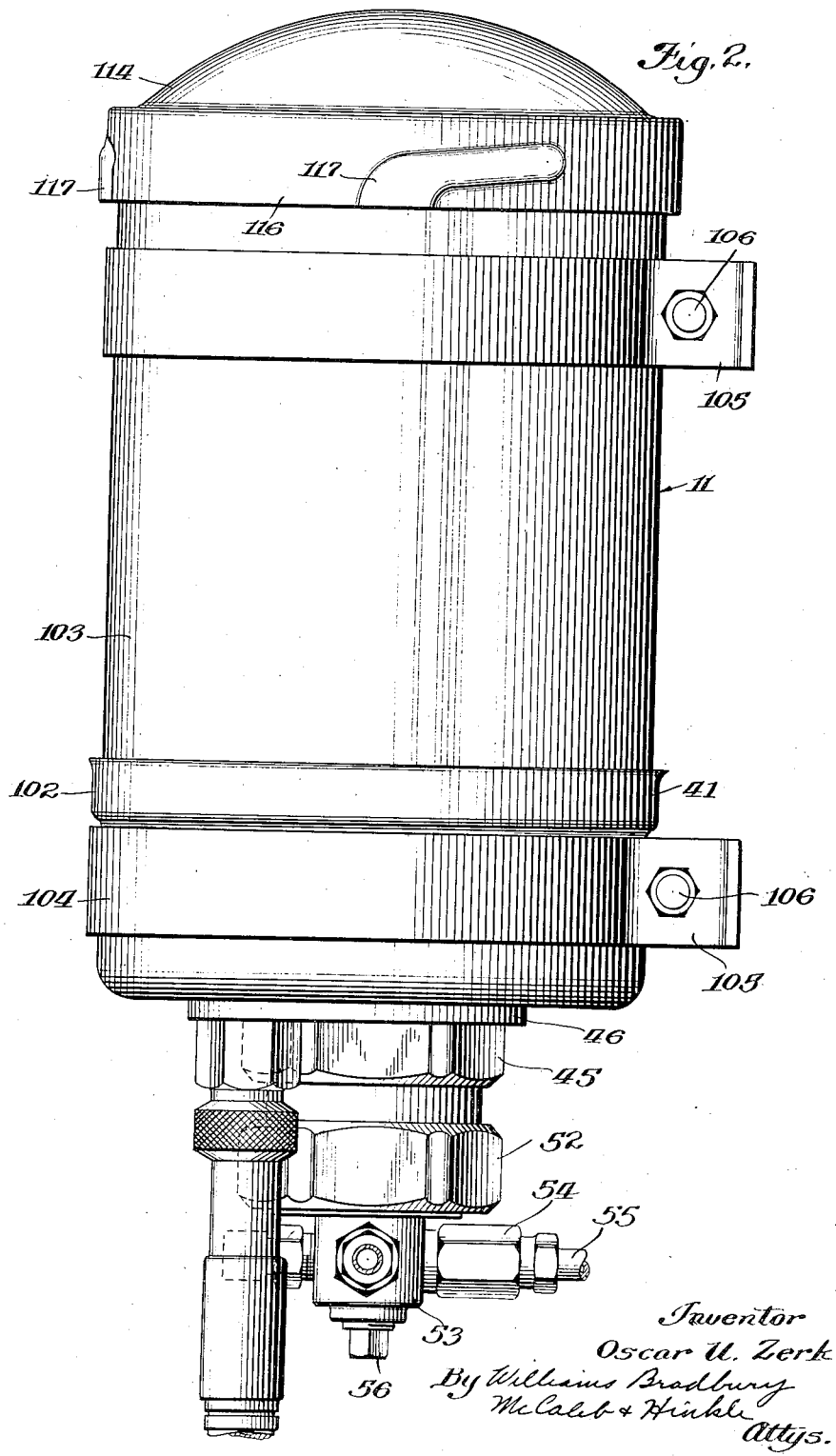
Figure 2 is a side elevation of the lubricant container or tank.
Figure 3:
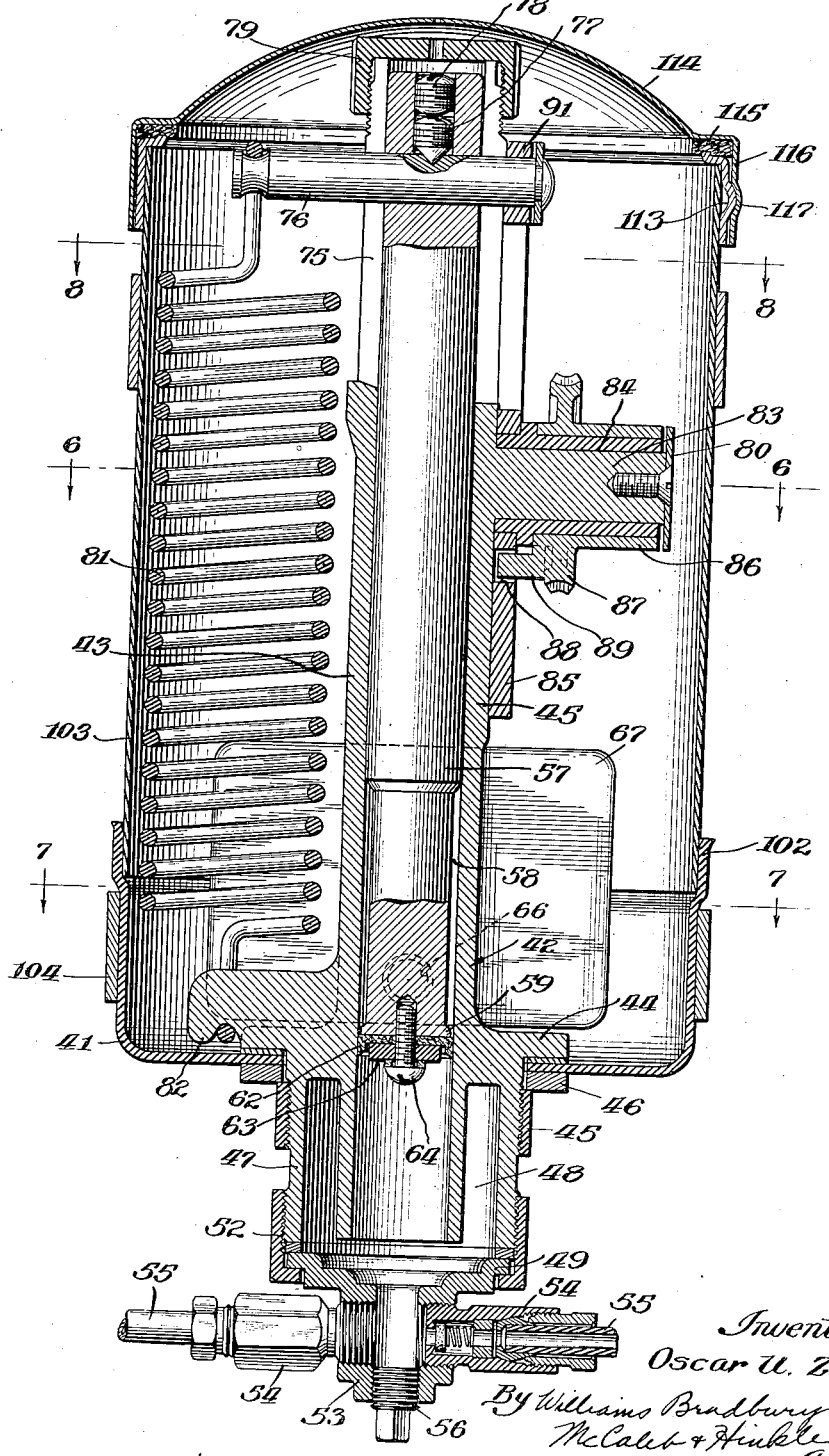
Figure 3 is a cross-section of the lubricant container showing the lubricant distributing pump.

The apparatus comprises in general a container 11 for lubricant within which a lubricant distributing pump is mounted which is actuated by means of a flexible drive 12 connected to the propeller shaft 13 of a motor vehicle not shown.

In many types of modern motor vehicles a speedometer 14 is actuated through a flexible drive 15 connected to the propeller shaft 13 of the motor vehicle. For this purpose a worm gear 16 is mounted on the propeller shaft which meshes with a pinion 17 mounted on a shaft 18 which is journalled in a housing 19. A plug 22 is threaded into housing 19 and forms a bearing for one end of shaft 18. Normally a cap 23 at the end of the flexible drive 15 is threaded directly onto plug 22, retaining the flattened end 24 of the rotatable member of the flexible drive in a slot 25 at the end of shaft 18. In order to connect the flexible drive 12 for the lubricating mechanism with the drive shaft, cap 23 is removed from plug 22 and a coupling 26 is inserted therebetween. This coupling comprises a housing 27 having a shaft 28 rotatably mounted therein. One end of this shaft is held in operating engagement with shaft 18 by a cap 29, the shafts being interconnected by a flat strip 32 engaging the slot at the end of each shaft. The other end of the shaft is similarly connected to the rotatable member 24 by threading the cap 23 onto a plug 33 at the opposite end of the housing.

Shaft 28 has a worm wheel 34 thereon which meshes with a pinion 35 rotatably mounted in the housing. Pinion 35 is connected to a second worm and gear mechanism 36 for driving a shaft 37 mounted in a plug 38 which is threaded into housing 27. The shaft 37 is connected to the rotatable member of flexible drive 22 in the usual manner.

The speed reduction between worm wheel 16 and pinion 17 is usually such that the rotatable member of the flexible drive 15 will make 1000 revolutions for each mile travelled by the vehicle. The speed reduction of coupling 26 is such that the rotatable member of flexible drive will be rotated five revolutions per mile travelled by the vehicle.

While the coupling 26 has been described as connected to the flexible drive of a speedometer of the type in which the speedometer is actuated by the propeller shaft, it will be evident that this coupling could be used equally well with other types of speedometer drives.

The lubricant container comprises a cup shaped base 41 of comparatively heavy material. Mounted within the base of the container is a casting 42 which comprises an upwardly extending tube 43 having a radially extending base 44 adapted to rest upon the edge of an aperture in the bottom of the base 41. The casting 42 is secured within the base of the container by a nut 45 and washer 46 which is forced by the nut against the lower side of the container. The tube extends downwardly through the base of the container and a cylindrical wall 47 surrounds the lower portion of the tube and forms an annular air space 48 around the tube which communicates with the tube under the lower edge of the tube. A cap 49 is retained upon the cylindrical wall 47 by a nut 52 forming an enclosed chamber at the end of the tube. Cap 49 is provided with a head 53 into which a plurality of plugs 54 are threaded which connect distributing pipes 55 to the head through which the lubricant is distributed to the various bearings of the vehicle chassis.

An aperture is provided in the lower side of head 53 for the purpose of draining sediment from the container, the opening being normally closed by a plug 56. The interior of tube 43 forms a cylinder in which piston 57 is reciprocably mounted. The lower end of the piston has a long annular recess 58 and the end of the piston is provided with a flange 59 which is spaced from the wall of the cylinder, leaving a slight annular clearance therebetween. The end of the piston is provided with a packing cup 62 retained upon the piston by a washer 63 and screw 64. The tube 43 is provided with a boss 65 which has an aperture 66 leading from the interior of the container to the recess 58 of the piston.

Mounted upon the boss 65 is a plate 67 having a flange 68 around its edge against which a screen 69 is held by a bolt 72. The plate 67 is provided with an aperture having a tubular portion 73 extending into the passage 66 leading to the recess around the piston. Thus the lubricant passing from the container into the cylinder must pass through the strainer 69. In the reciprocation of piston 57 the upward or retractile movement of the piston will cause the packing cup 62 at the face of the piston to collapse or withdraw from the wall of the piston, allowing lubricant to pass by the packing cup into the cylinder. Upon the forward or protractile movement of the piston the packing cup will be forced against the wall of the piston by the pressure of the lubricant in the cylinder, thereby causing the lubricant in the cylinder to be forced into the lubricant distributing lines 55.

It has been found that the air which is absorbed by the lubricant has a tendency to be liberated therefrom and accumulate in the cylinder which interferes with the proper operation of the apparatus due to the high compressibility of the air. In order to remove the air from the lubricant distributing mechanism the annular space 48 is provided into which all of the air in the discharge chamber passes when the piston is in its lower position. An air release means is provided in the upper part of the air space 48 which comprises a threaded plug 73' in an aperture leading from the air space to passage 66 from which the air may be returned to the container. The outer edges of the threads on the plug 73' may be slightly reduced so as to form a spiral path from the air space 48 into the container. It has been found that such a path will readily permit air to escape from the air space but that it forms an extremely high resistance to the passage of oil so that practically no oil will be returned to the container through this valve.

The actuating mechanism for the piston will now be described. The upper end of the tube 43 is provided with a pair of diametrically opposite longitudinal slots 75. A pin 76 extends through an aperture in the upper end of the piston and projects laterally through each of the slots 75. The pin 76 is secured in the piston by a set screw 77 and lock screw 78. The top of the tube may be closed by a cap 79 which reinforces the upper portion of the tube.

Attached to one end of pin 76 is a spring 81, the other end of which is secured to a lug 82 on the casting 42. This spring serves to constantly urge the piston to its forward position. Integral with tube 43 is a stub shaft 83 which projects laterally therefrom. Surrounding shaft 83 is a collar 84 to which a cam 85 is rigidly secured and surrounding collar 84 is a second collar 86 which carries a worm gear 87. Collars 84 and 86 are retained upon the shaft by a washer 80 secured to the end of the shaft.

Figure 4:
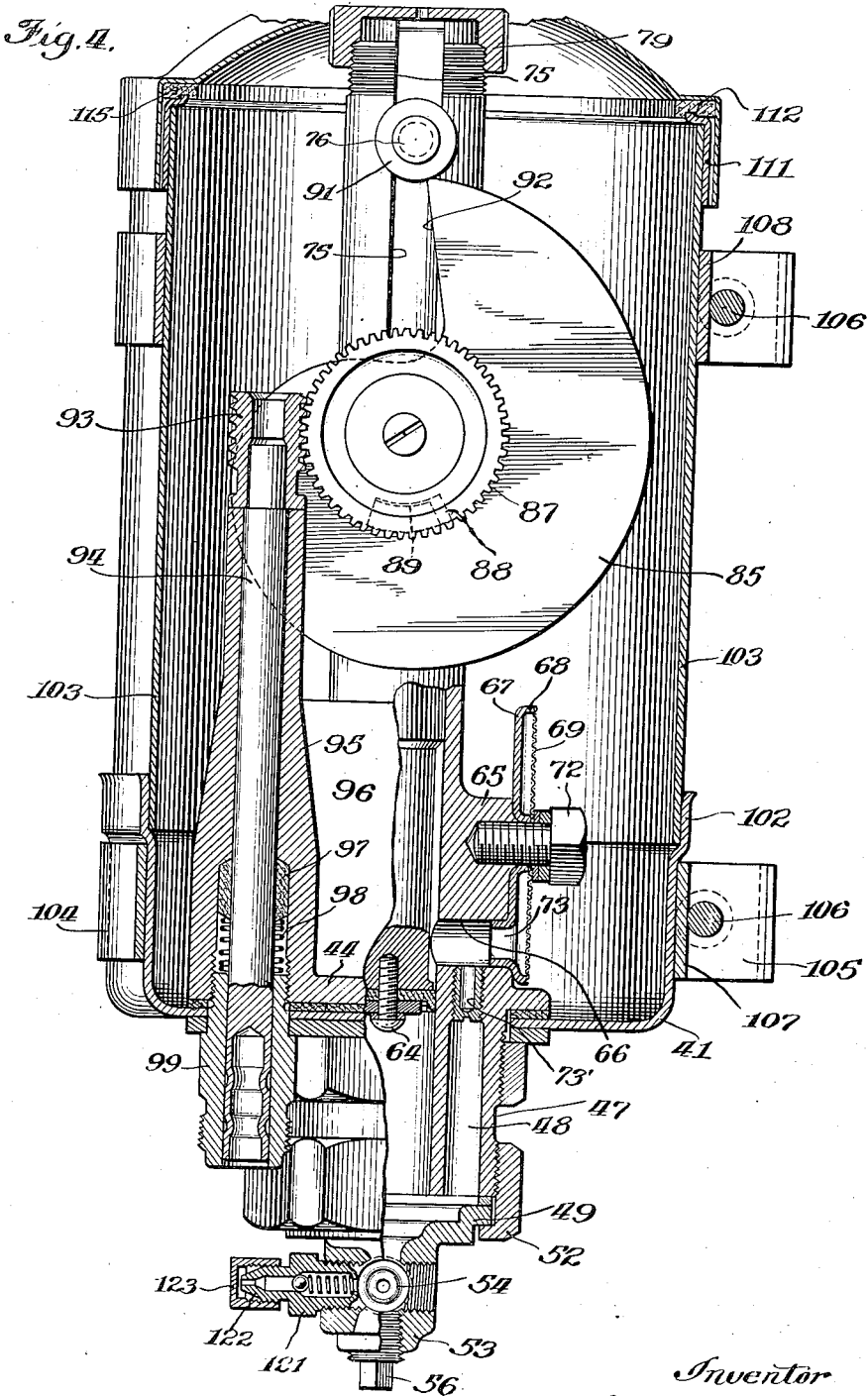
Figure 4 is a cross-section of the lubricant tank taken on a different angle than Figure 3 and showing the actuating mechanism for the distributing pump.
Figure 5:
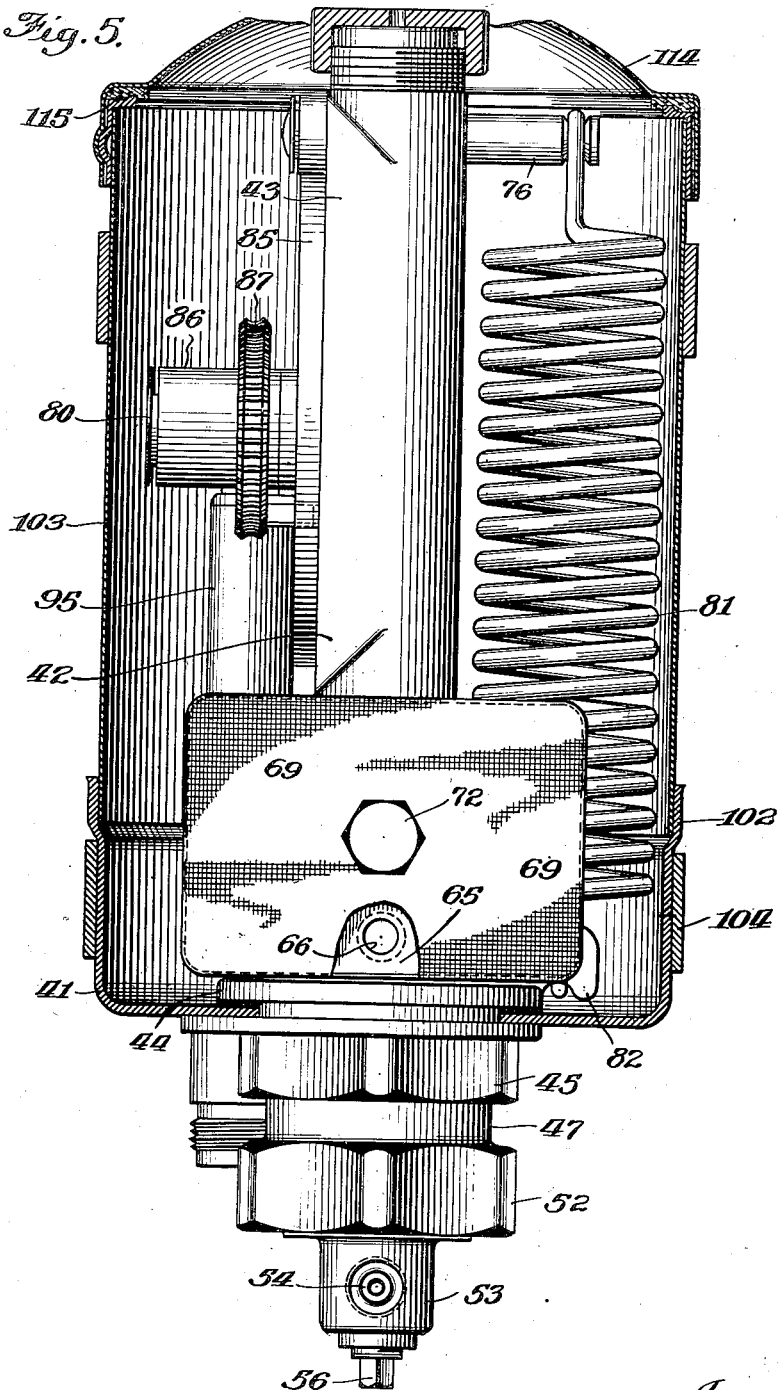
Figure 5 is a cross-section of the lubricant container similar to Figure 3 but rotated through an angle of 180 degrees.
Figure 6:
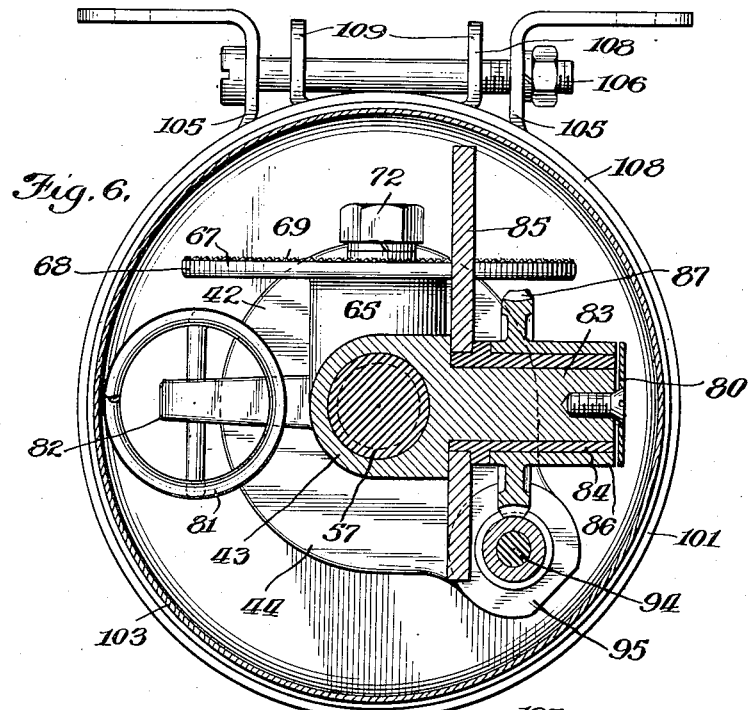
Figure 6 is a section through the container taken on line 6—6 of Figure 3.
Figure 7:
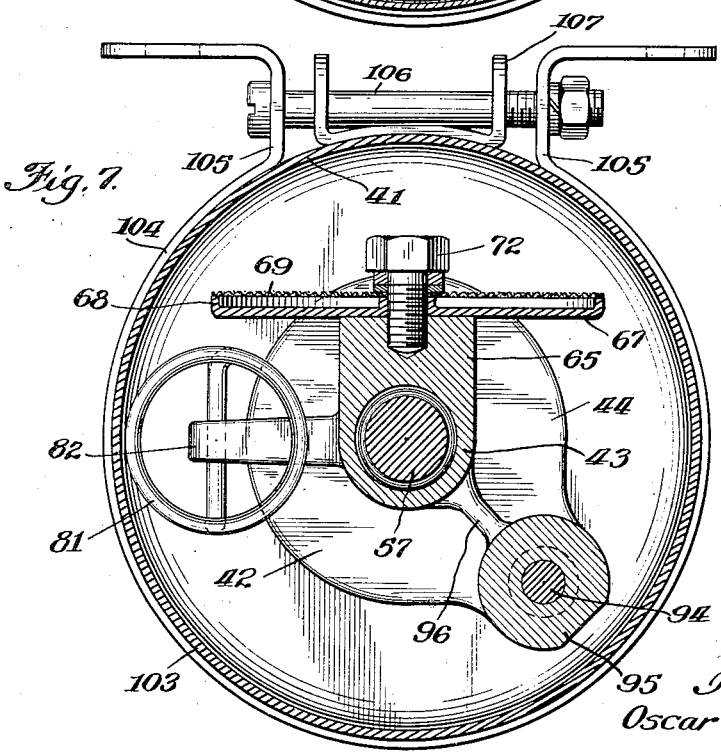
Figure 7 is a section through the container taken on line 7—7 of Figure 3.

The cam 85 has an arcuate slot 88 therein into which a pin 89 carried by the pinion 87 projects, thus providing a lost motion between pinion 87 and cam 85 equal to the length of the arcuate slot. The periphery of cam 85 is spirally shaped and has an offset 92 extending from the outer end of the spiral to a point close to the collar 84. Collar 91 mounted on the end of pin 76 opposite the end to which the spring is attached rides upon the periphery of cam 85. Upon the rotation of cam 85 in a clockwise direction, as viewed in Figure 4, piston 57 will be gradually raised to its uppermost position until roller 91 reaches the offset portion 92 of the cam. When the roller reaches this portion of the cam, spring 81 will move the piston forwardly to force the lubricant from the cylinder into the distributing lines 55 from which the lubricant is distributed to the various bearings of the vehicle. The distributing lines are usually provided with metering device for the purpose of apportioning the lubricant between the various bearings to be lubricated.

It will be noted that just as the roller 91 passes over the offset portion 92 of the cam there will be a tendency for the roller to move the cam forwardly. This forward movement of the cam if communicated to the drive mechanism would result in a back lash of the gears in the driving mechanism. In order to prevent this back lash the lost motion between slot 88 and pin 89 is provided, permitting the cam to move forwardly without communicating this movement to the worm gear 87.

The gear 87 is adapted to be driven by a worm 93 mounted upon a shaft 94. Shaft 94 is journalled in a vertically extending bearing 95 which is formed integral with the base plate 44 of casting 42 and is connected with the tube 43 by an integral web 96. A packing 97 is provided within bearing 96 and is compressed by a spring 98 which rests at one end against a plug 99 threaded into bearing 95 through the base plate 51. Shaft 94 is adapted to be driven by the rotating member of the flexible drive 12. It will be seen from the above description that the entire distributing pump and the actuating mechanism therefor are mounted in and supported by the base 41 of the container which is made of rather heavy material.

The upper end of the cup shaped base 41 is provided with an offset portion 102 which is adapted to receive a cylinder 103 of much lighter construction than the cup 41. The cylinder 103 may be secured to the cup 41 by welding or any other suitable means. Surrounding the cup shaped base is a band 104, the ends 105 of which are formed into substantially U-shaped portions which are drawn to each other by a bolt 106 to firmly clamp the band about the base of the container. In order to prevent distortion of the portion of the cup shaped base between the ends 105 a reinforcing member 107 conforming to the contour of the cup is placed upon the bolt 106.

The ends of the band are provided with holes for securing the container to the dash board or other suitable part of the vehicle. A similar band 108 is placed about the cylindrical part 103 of the container and is provided with a similar reinforcing member 109. The upper edge of the container is reinforced by a ring 111 which has an inwardly and upwardly extending flange 112. The ring 111 is provided with a pair of lugs 113.

A cap 114 provided with a ring 115 of cork or other suitable material is provided for covering the container. This cap has a downwardly extending flange 116 which is provided with beads 117 adapted to cooperate with lugs 113 to secure the cap upon the container. In order to fill the container with lubricant the cap may be removed, rotating it slightly in a counter-clockwise direction.

The operation of the apparatus is as follows:

When the vehicle is idle propeller shaft 13 will be idle and no lubricant will be supplied to the vehicle bearings. Upon the movement of the vehicle, shaft 13 will rotate which rotation is communicated through the flexible drive 12 to shaft 94 mounted within the container. As stated above, the rotatable member of the flexible drive shaft 12 rotates about five revolutions per mile and the ratio of worm 93 and worm gear 87 is about one to fifty so that gears 87 will be rotated one revolution every ten miles, causing one reciprocation of piston 67 each ten miles that the vehicle travels. The cylinder of the distributing pump is of such capacity as to supply all the bearings with the proper amount of lubricant for this distance. While only two distributing pipes 55 are shown, it is evident that any number of pipes may be connected to the head 52 to obtain the desired distribution of lubricant. The head 53 may also be provided with a plug 121 carrying a nipple 122 through which lubricant may be supplied to the bearings by external means such as a hand pump of the usual construction. This nipple may also be used to prime the lubricant system to insure that all of the distributing lines are filled with lubricant before the vehicle is set in motion. A cap 123 may be placed over the nipple to protect it against dust and dirt when not in use.

Figure 9 illustrates a modified form of piston for the distributing pump. In this apparatus the piston is provided with a recess 58' which communicates with the container through passage 66' and filter member 69'. The interior of the piston is provided with a hollow cylindrical cavity 131 which communicates with recess 58' through an aperture 132 in the wall of the piston below the cylindrical cavity 131. The piston has an enlarged bore 132' and a ball-type valve 133 is adapted to seat against the shoulder formed between cavity 131 and bore 132'. A collar 134 is secured in the lower portion of the piston by a pin 135 and a spring 136 serves to retain the valve closed against its seat. During the upward movement of the piston, ball 133 will be unseated allowing fluid from cavity 131 to pass into the cylinder. Upon the downward movement of the piston, ball 133 will be seated, causing fluid under pressure to be discharged from the cylinder.

The operation of this device is substantially the same as that of the preferred form of the invention.

Having described the nature and embodiments of my invention, what I desire to secure by U. S. Letters Patent is as follows:

1. In a lubricating apparatus for a motor vehicle having bearings, a lubricant container, a central tube therein having a pair of longitudinal slots and secured to the base of the container, the lower portion of the tube forming a cylinder, a piston movable therein, a pin secured to the end of the piston and extending through the longitudinal slots in the end of the tube, a spring attached to one end of the pin for advancing the piston in the tube, a cam engaging the other end of the pin for retracting the piston, and means for rotating the cam, thereby causing the piston to force lubricant to the vehicle bearings.

2. In a lubricating apparatus for a motor vehicle, a lubricant container, a tube in the container secured to the base thereof, said tube forming a cylinder, a piston movable therein, a cup surrounding the end of the tube forming an annular space around the cylinder communicating at its lower end with the cylinder, said space being adapted to collect air liberated from the lubricant, an air escape means for allowing air to escape from said space into the container and means for reciprocating the piston to supply lubricant to the vehicle.

3. In a lubricating apparatus for a motor vehicle, a container for lubricant, a pump cylinder in said container having an open discharge end, a piston in said cylinder, a chamber surrounding the discharge end of the cylinder extending thereabove, the upper portion of said chamber being adapted to collect air liberated from the lubricant discharged from said cylinder, air escape means in the upper portion of said chamber for releasing said air into the container and for preventing the return movement of air and lubricant therethrough, and means for reciprocating the piston to supply lubricant to the vehicle.

4. In lubricating apparatus of the class described, a lubricant reservoir, supporting brackets therefor, said reservoir having an opening in its bottom, a part extending across said opening and providing a pump cylinder projecting therethrough, a plunger reciprocable in said cylinder, means for reciprocating said plunger, a chamber surrounding said cylinder and receiving lubricant discharged therefrom, and a bleeder connecting said chamber with said reservoir and extending through said part.

OSCAR U. ZERK.